(12) United States Patent
Takagi (10) Patent No.: US 12,300,130 B2
(45) Date of Patent: May 13, 2025

(54) IMAGE PROCESSING APPARATUS, DISPLAY APPARATUS, IMAGE PROCESSING METHOD, AND STORAGE MEDIUM

(71) Applicant: CANON KABUSHIKI KAISHA, Tokyo (JP)

(72) Inventor: Shin Takagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/345,069

(22) Filed: Jun. 30, 2023

(65) Prior Publication Data

US 2024/0013688 A1 Jan. 11, 2024

(30) Foreign Application Priority Data

Jul. 7, 2022 (JP) ................. 2022-109481

(51) Int. Cl.
*G09G 3/00* (2006.01)
*G06F 3/01* (2006.01)
*G06T 7/90* (2017.01)

(52) U.S. Cl.
CPC ............. *G09G 3/001* (2013.01); *G06F 3/013* (2013.01); *G06T 7/90* (2017.01); *G09G 2320/0666* (2013.01); *G09G 2340/045* (2013.01); *G09G 2340/0464* (2013.01); *G09G 2354/00* (2013.01)

(58) Field of Classification Search
CPC .......... G06F 3/013; G06T 7/90; G09G 3/001; G09G 2320/0666; G09G 2340/045; G09G 2340/0464; G09G 2354/00
See application file for complete search history.

(56) References Cited

U.S. PATENT DOCUMENTS

2016/0078685 A1* 3/2016 Koga .................. G06F 3/04815
  345/633
2021/0390928 A1* 12/2021 Nishibe ............... H04N 13/239
2022/0036779 A1* 2/2022 Nishibe ............... G06F 3/04815

FOREIGN PATENT DOCUMENTS

| JP | 2017-521689 A | 8/2017 |
| JP | 2017-539108 A | 12/2017 |
| WO | 2016/011367 A1 | 1/2016 |
| WO | 2016/045784 A1 | 3/2016 |

* cited by examiner

*Primary Examiner* — Nelson M Rosario
(74) *Attorney, Agent, or Firm* — Cowan, Liebowitz & Latman, P.C.

(57) ABSTRACT

An image processing apparatus includes at least one memory that stores a set of instructions, and at least one processor that executes the set of instructions to acquire a captured image obtained by imaging real space, and control object information displayed on a transmission-type display element that enables a user to observe the real space. The at least one processor changes a display method of the object information on the transmission-type display element based on image information including color information or luminance information of the captured image.

16 Claims, 8 Drawing Sheets

IMAGE PROCESSING APPARATUS, DISPLAY APPARATUS, IMAGE PROCESSING METHOD, AND STORAGE MEDIUM

BACKGROUND

Technical Field

One of the aspects of the embodiments relates to an image processing apparatus, a display apparatus, an image processing method, and a storage medium.

Description of Related Art

An augmented reality (AR) display apparatus for viewing AR space has conventionally been known. A transmission-type AR display apparatus known as the AR display apparatus can superimpose and display an object and information onto the real world while enabling the user to directly view the real world with his eyes. In a case where the real world is bright, the contrast of information such as characters and an image displayed on a monitor of the transmission-type AR display apparatus becomes lower, and the user may have difficulty in visually recognizing the information displayed on the monitor.

Japanese PCT Domestic Publication No. 2017-521689 discloses a method of securing a contrast value between a virtual image and a real-world scene by controlling the light output from each pixel in a self-luminous micro-display. Japanese Patent Laid-Open No. 2017-539108 discloses a method of detecting a gaze point of the user and of adjusting the transmittance of the monitor in order to improve the visibility of the information on the monitor. Japanese PCT Domestic Publication No. 2017-539108 discloses a method for improving the visibility by displaying an object at a screen edge in which in a case where the user is not viewing an object, and by moving the object from the screen edge to the screen center in a case where the user is viewing the object.

The method disclosed in Japanese PCT Domestic Publication No. 2017-521689 can control the brightness of the pixel value, but in a case where the background is bright, the contrast improvement becomes insufficient and the visibility improvement becomes insufficient. The method disclosed in Japanese PCT Domestic Publication No. 2017-539108 can move the object that the user is viewing to the screen center to improve the visibility, but cannot improve the visibility of the object in a case where the background of the screen center is bright because the contrast at the screen center is low.

SUMMARY

An image processing apparatus according to one aspect of the disclosure includes at least one memory that stores a set of instructions, and at least one processor that executes the set of instructions to acquire a captured image obtained by imaging real space, and control object information displayed on a transmission-type display element that enables a user to observe the real space. The at least one processor changes a display method of the object information on the transmission-type display element based on image information including color information or luminance information of the captured image. A display apparatus having the above image processing apparatus, an image processing method corresponding to the above image processing apparatus, and a storage medium storing a program that causes a computer to execute the above image processing method also constitute another aspect of the disclosure.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

Figure 1:
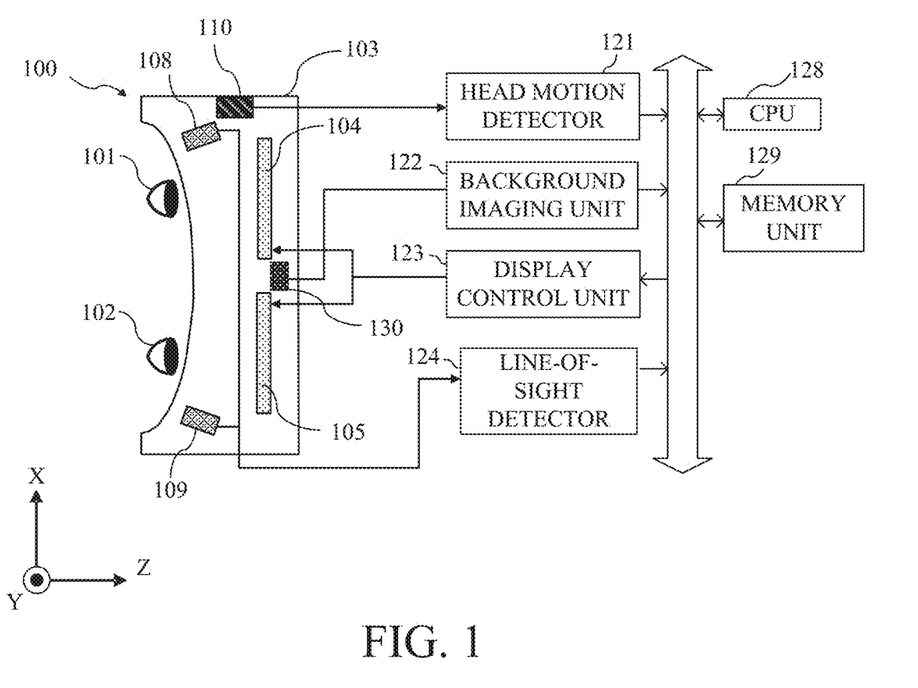
FIG. 1 is a schematic diagram of a display apparatus according to this embodiment.
Figure 2:
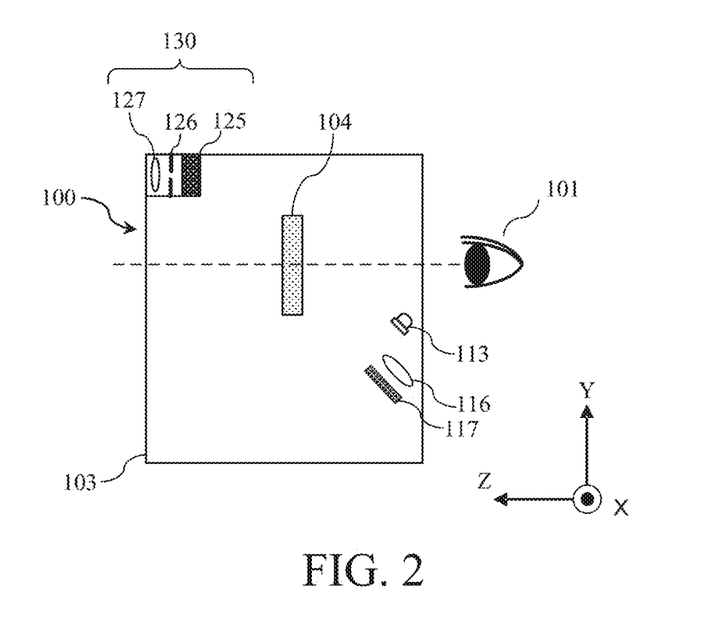
FIG. 2 is a schematic diagram of a line-of-sight detecting mechanism in the display apparatus according to this embodiment.

Referring now to FIGS. 1 and 2, a description will be given of a configuration of a display apparatus (transmission-type AR display apparatus) 100 according to this embodiment. FIG. 1 is a schematic diagram of a display apparatus 100. In FIG. 1, a left side illustrates a sectional view of a housing 103 of the display apparatus 100 viewed from the crown side of the user, and a right side illustrates a block diagram of an image processing apparatus of the display apparatus 100. FIG. 2 is a schematic diagram of a line-of-sight detecting mechanism of the display apparatus 100, and illustrates a sectional view of the display apparatus 100 taken along the YZ plane formed by a Y-axis and a Z-axis illustrated in FIG. 1. FIG. 2 is a sectional view viewed from the left eye side of the user, and the mechanism on the left eye side will be described, but the mechanism on the right eye side of the user has the same configuration.

The display apparatus 100 includes a CPU (control apparatus) 128 for overall control and a memory unit (storage unit) 129 for recording image information. In a case where the housing 103 of the display apparatus 100 is attached to the head of the user, a left eyeball 101 and right eyeball 102 of the user can observe the real space (real world) through a left-eye display 104 and right-eye display 105, which are transmission-type display elements, respectively.

A background imaging unit (acquiring unit) 122 acquires a captured image of the real space in the front direction of the user obtained by imaging with a background camera 130 (captured image obtained by imaging the real space). A display control unit 123 displays an image such as a virtual object (main information) and associated object information (auxiliary information) on each of the left-eye display 104 and the right-eye display 105. That is, the display control unit 123 controls auxiliary information displayed on the left-eye display 104 and the right-eye display 105 on which the user can observe the real space. Thereby, the display control unit 123 can superimpose a display image on the real space viewed by the user through the left-eye display 104 and the right-eye display 105. As described below, the display control unit 123 changes a display area of the auxiliary information in each of the left-eye display 104 and the right-eye display 105 based on image information including color information or luminance information of the captured image.

A left-eye imaging unit 108 and a right-eye imaging unit 109 acquire eyeball images by imaging the left eyeball 101 and right eyeball 102 of the user, respectively. A line-of-sight detector 124 performs line-of-sight detecting processing using the eyeball images acquired by the left-eye imaging unit 108 and the right-eye imaging unit 109, and estimates positions at which the user is gazing on the left-eye display 104 and the right-eye display 105. Details of the line-of-sight detecting processing will be described below.

A motion sensor 110 includes an acceleration sensor and a gyro sensor, and detects accelerations in the X-axis direction, the Y-axis direction, and the Z-axis direction, and angular velocities around the X-axis, the Y-axis, and the Z-axis of the display apparatus 100, respectively. A head motion detector 121 can detect the head motion of the user based on the accelerations and angular velocities detected by the motion sensor 110. The memory unit 129 stores an imaging signal from a camera image sensor 125 and an eyeball image sensor 117.

The background camera 130 captures an image of the outside (background) of the display apparatus 100 and includes a camera image sensor 125, an aperture (stop) mechanism 126, and a focus mechanism 127. Each of the left-eye imaging unit 108 and the right-eye imaging unit 109 includes an illumination light source 113, a light receiving lens 116, and the eyeball image sensor 117. The illumination light source 113 is a light source that projects light onto the left eyeball 101 and the right eyeball 102 for line-of-sight detection, and includes, for example, a plurality of infrared light emitting diodes. An illuminated eyeball image and an image of corneal reflection (corneal reflection image) of the illumination light source 113 are imaged, by the light receiving lens 116, on the eyeball image sensor 117 that includes two-dimensional photoelectric element arrays such as a CMOS sensor. The light receiving lens 116 is disposed so that the pupils of the left eyeball 101 and right eyeball 102 of the user and the eyeball image sensor 117 are in a complementary imaging relationship. From the positional relationship between the eyeball image and the corneal reflection image of the illumination light source 113, which are formed on the eyeball image sensor 117, the line-of-sight direction is detected by line-of-sight detecting processing in accordance with a predetermined algorithm, which will be described below.

Figure 3:
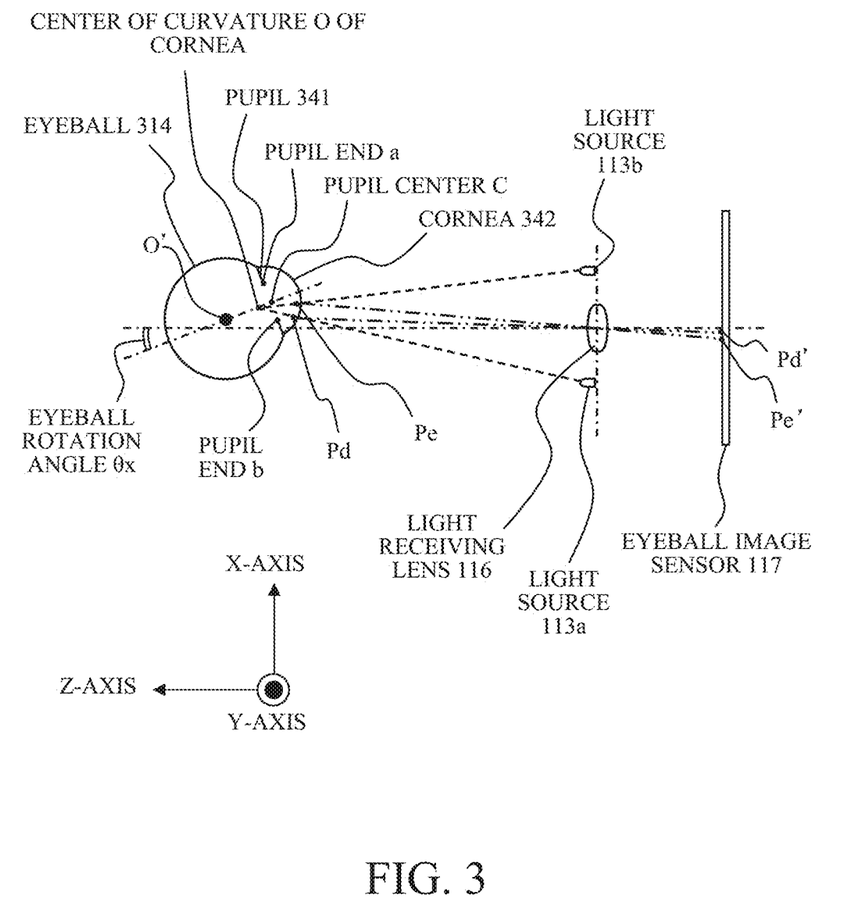
FIG. 3 explains a line-of-sight detection principle in this embodiment.
Figure 4A:
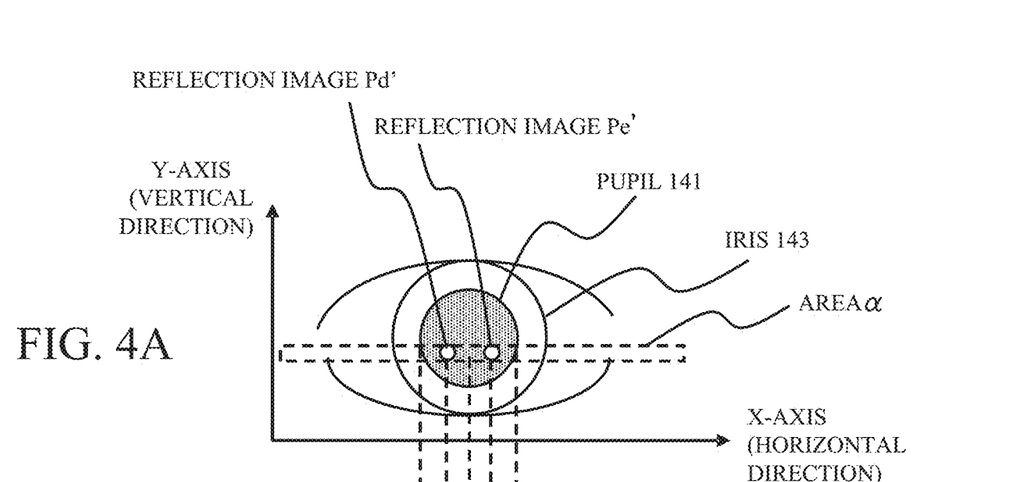
FIGS. 4A and 4B explain an eyeball image projected onto an eyeball image sensor and the output intensity of the eyeball image sensor in this embodiment.
Figure 4B:
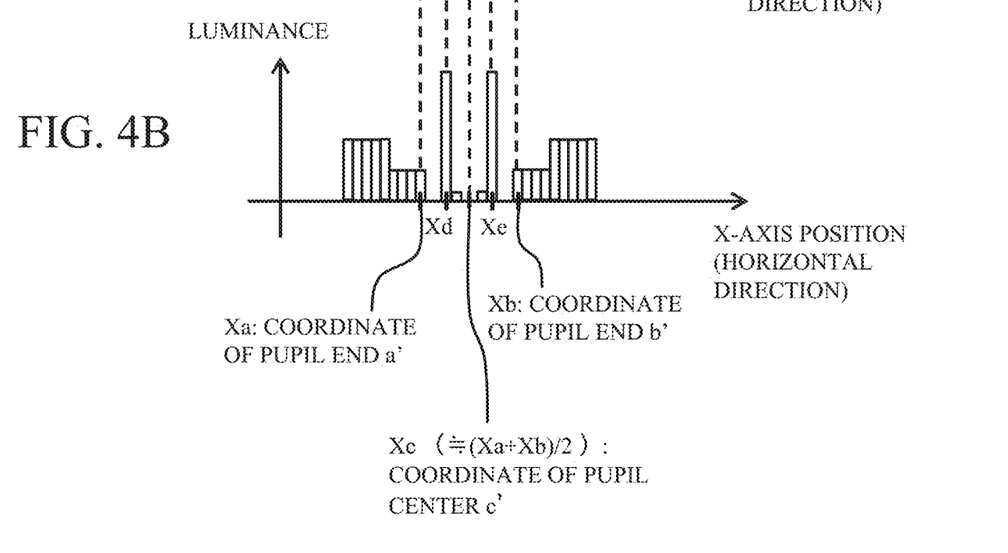
Figure 5:
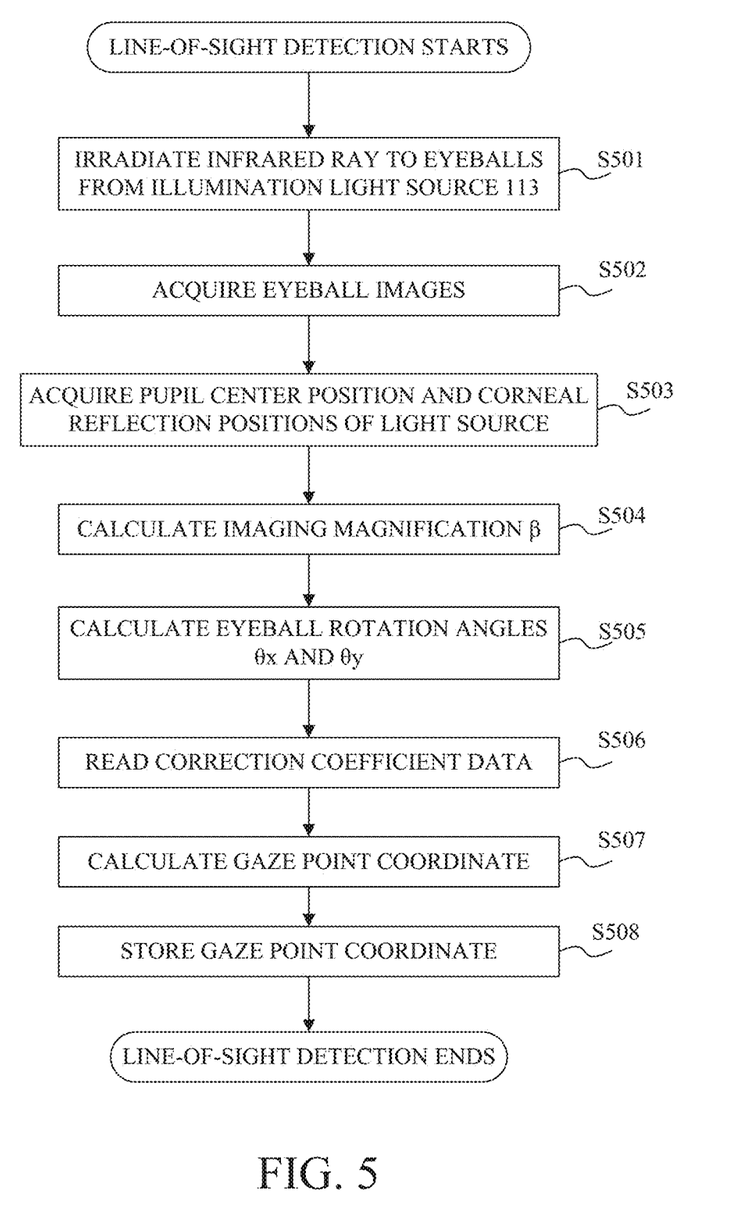
FIG. 5 is a flowchart illustrating line-of-sight detecting processing according to this embodiment.

Referring now to FIGS. 3 to 5, a description will be given of the line-of-sight detecting processing for the user. FIG. 3 explains a line-of-sight detection principle. In FIG. 3, light sources 113$a$ and 113$b$ (illumination light source 113) are light sources such as light emitting diodes that emit infrared light that is imperceptible to the user. The light sources 113$a$ and 113$b$ illuminate the eyeballs of the user. Part of the illumination light reflected by each eyeball of the user is condensed by the light receiving lens 116 onto the eyeball image sensor 117.

FIG. 4A explains an eyeball image projected on the eyeball image sensor 117. FIG. 4B explains the output intensity of the CCD of the eyeball image sensor 117. FIG. 5 is a flowchart illustrating the line-of-sight detecting processing.

In FIG. 5, in a case where the line-of-sight detecting processing (line-of-sight detecting routine) starts, first, in step S501, the illumination light source 113 (light sources 113$a$ and 113$b$) emits infrared light toward the eyeball 314 of the user. The eyeball image of the user illuminated by the infrared light is formed on the eyeball image sensor 117 through the light receiving lens 116. The eyeball image sensor 117 photoelectrically converts the eyeball image formed by the light receiving lens 116 and outputs an electric signal (image signal). Next, in step S502, the CPU 128 acquires an image signal (eyeball image signal) from the eyeball image sensor 117.

Next, in step S503, the CPU 128 acquires, based on the eyeball image signal acquired in step S502, coordinates (pupil center position, corneal reflection position of the light source) corresponding to the corneal reflection images Pd and Pe of the light sources 113$a$ and 113$b$ and pupil center c illustrated in FIG. 3. The infrared light beams emitted from the light sources 113$a$ and 113$b$ illuminate the corneas 342 of the eyeballs 314 of the user. At this time, each of the corneal reflection images Pd and Pe formed by part of the infrared light reflected on the surface of the cornea 342 is condensed by the light receiving lens 116 and imaged on the eyeball image sensor 117 (reflection image Pd' and Pe'). Similarly, light beam from the end of a pupil 341 (pupil ends a and b) is also imaged on the eyeball image sensor 117.

FIG. 4A illustrates an image example of a reflection image obtained from the eyeball image sensor 117, and FIG. 4B illustrates a luminance information example obtained from the eyeball image sensor 117 in an area a of the image example in FIG. 4A. In FIG. 4A, a horizontal direction is an X-axis and a vertical direction is the Y-axis. At this time, Xd and Xe are coordinates in the X-axis direction (horizontal direction) of reflection images Pd' and Pe' formed by the corneal reflection images Pd and Pe of the light sources 113*a* and 113*b*, respectively. Xa and Xb are coordinates in the X-axis direction of the images (pupil ends a' and b') formed by the light beams from the pupil ends a and b of the pupil 341, respectively.

In the luminance information example of FIG. 4B, extremely high luminance levels are obtained at the positions Xd and Xe corresponding to the reflection images Pd' and Pe' formed by the corneal reflection images Pd and Pe of the light sources 113*a* and 113*b*. Extremely low luminance levels are obtained in areas between the coordinate Xa (coordinate of a pupil end a') and the coordinate Xb (coordinate of a pupil end b'), which corresponds to the area of the pupil 341, except for the positions Xd and Xe. Intermediate luminance levels between the above two luminance levels are obtained in an area having an X-coordinate value lower than the coordinate Xa and an area having an X-coordinate value higher than the coordinate Xb, each of which corresponds to the area of an iris 343 outside the pupil 341. Based on the luminance level fluctuation information relative to the X-coordinate position, the X-coordinates Xd and Xe of the reflection images Pd' and Pe' formed by the corneal reflection images Pd and Pe of the light sources 113*a* and 113*b* and the X-coordinates Xa and Xb of the pupil ends a' and b' can be obtained.

In a case where a rotation angle θx of the optical axis of the eyeball 314 relative to the optical axis of the light receiving lens 116 is small, the coordinate Xc of a portion (pupil center c') corresponding to the pupil center c formed on the eyeball image sensor 117 can be expressed as Xc≈(Xa+Xb)/2. Hence, the X coordinate of the pupil center c' imaged on the eyeball image sensor 117 and the coordinates of the corneal reflection images Pd' and Pe' of the light sources 113*a* and 113*b* can be estimated.

Next, in step S504 of FIG. 5, the CPU 128 calculates imaging magnification β of the eyeball images. The imaging magnification β is magnification determined by the position of the eyeball 314 relative to the light receiving lens 116, and can be obtained substantially as a function of a distance (Xd-Xe) between the reflection images Pd' and Pe'. Next, in step S505, the CPU 128 calculates eyeball rotation angles (eyeball angles) Ox and Oy. The X coordinate of the midpoint between the corneal reflection images Pd and Pe substantially coincides with the X coordinate of the center of curvature O of the cornea 342. Therefore, where Oc is a standard distance between the center of curvature O of the cornea 342 and the pupil center c, the rotation angle θx of the optical axis of the eyeball 314 in the ZX plane is given by the following equation (1):

$$\beta * Oc * \mathrm{SIN}\ \theta x \approx \{(Xd+Xe)/2\} - Xc \qquad (1)$$

FIG. 5 illustrates an example of calculating the rotation angle θx in a case where the eyeball of the user rotates within a plane orthogonal to the Y-axis. The method of calculating the rotation angle θy in the case where the eyeball of the user rotates within a plane orthogonal to the X-axis is also the same.

In a case where the rotation angles θx and θy of the optical axis of the eyeball 314 of the user are calculated in step S505, the CPU 128 reads correction coefficient data in step S506. Next, in step S507, the CPU 128 finds the position of the line-of-sight of the user (the position of each gazed point, referred to as a gaze point position) on the display apparatus (the left-eye display 104 or the right-eye display 105) using the rotation angles θx and θy. The gaze point position is calculated as the coordinates (Hx, Hy) corresponding to the center c of the pupil 341 on the display apparatus using the following equations (2) and (3):

$$Hx = m \times (Ax \times \theta x + Bx) \qquad (2)$$

$$Hy = m \times (Ay \times \theta y + By) \qquad (3)$$

In equations (2) and (3), the coefficient m is a constant representing the relationship between the rotation angles θx and θy of the eyeballs of the user and the position on the display apparatus. That is, the coefficient m is a conversion coefficient for converting the rotation angles θx and θy into position coordinates corresponding to the center c of the pupil 141 on the display apparatus, and is determined in advance and stored in the memory unit 129. In equations (2) and (3), Ax, Bx, Ay, and By are line-of-sight correction coefficients (correction coefficient data) for correcting individual differences in the lines of sight of the user, obtained by performing calibration work described below, and stored in the memory unit 129 before the line-of-sight detecting routine starts.

After the coordinates (Hx, Hy) of the center c of the pupil 141 on the display apparatus are calculated, in step S508, the CPU 128 stores the gaze point position (gaze point coordinates) calculated in step S507 in the memory unit 129 and ends the line-of-sight detecting routine.

This embodiment has discussed the method of obtaining the gaze point coordinates on the lens element using the corneal reflection images of the light sources 113*a* and 113*b*. Another method may be used as long as it is a method for obtaining an eyeball rotation angle from a captured eyeball image.

Figure 9A:
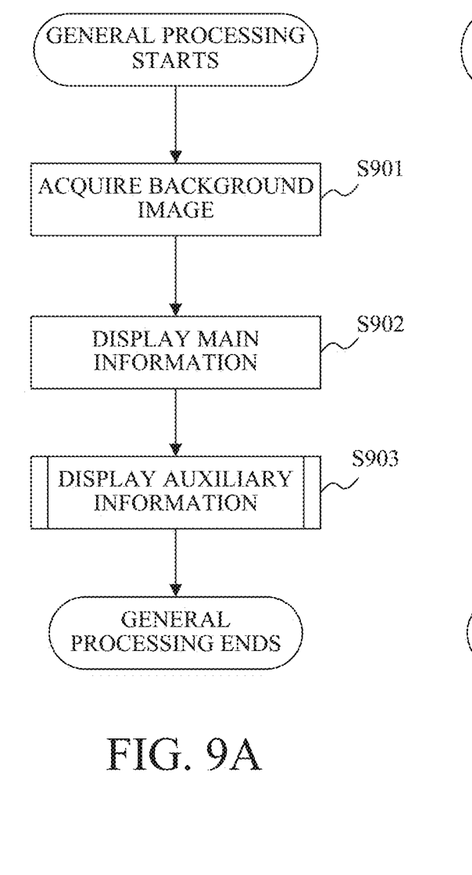
FIGS. 9A and 9B are flowcharts illustrating display processing of main information and auxiliary information according to this embodiment.
Figure 9B:
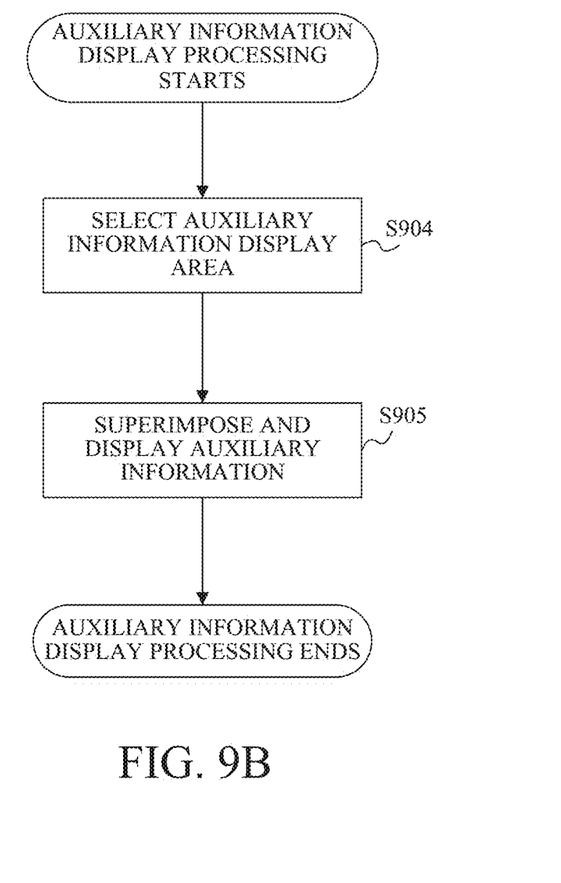

Referring now to FIGS. 9A and 9B, a description will be given of display processing for displaying main information and auxiliary information on the left-eye display 104 and right-eye display 105 of the display apparatus 100. FIGS. 9A and 9B are flowcharts illustrating display processing for main information and auxiliary information. The main information in this embodiment includes, for example, a human avatar or an inorganic CG object, which is an object displayed on the position of each of the left-eye display 104 and the right-eye display 105 so that the user can recognize the object in a case where the object exists at a predetermined position in the real space. The auxiliary information in this embodiment includes information that explains a features of an object in the real space or an object as the main information described above. For example, in a case where the object is a person, the auxiliary information includes his name, profile, and the like.

Figure 6:
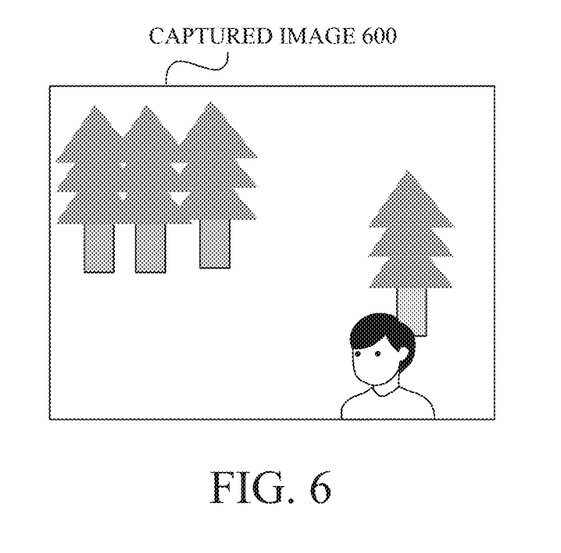
FIG. 6 illustrates an example of a captured image in this embodiment.

First, in step S901 of FIG. 9A, the CPU 128 in the display apparatus 100 controls the background imaging unit 122 to drive the camera image sensor 125 and capture the background in front of the user (acquire the background image). FIG. 6 illustrates an example of a captured background image (captured image 600). In practice, it is difficult to accord the captured image 600 illustrated in FIG. 6 and the image viewed by the eyes of the user with each other. Nevertheless, this embodiment assumes that they accord with each other.

Figure 7:
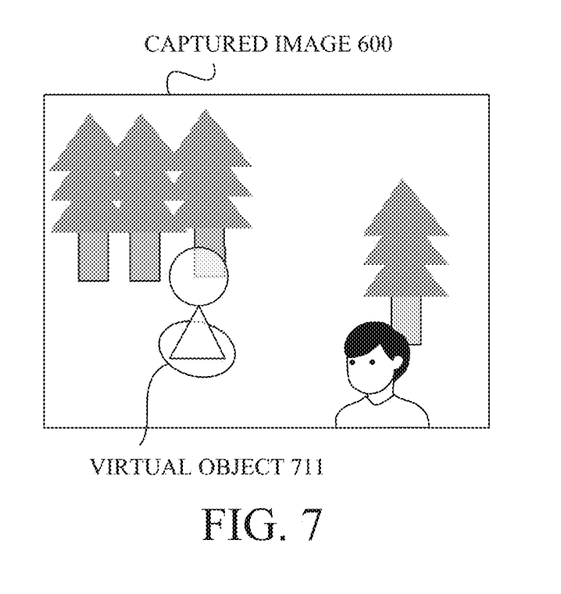
FIG. 7 illustrates an example of a virtual object superimposed and displayed on a captured image in this embodiment.

Next, in step S902, the CPU 128 controls the display control unit 123 to display main information such as virtual objects on the left-eye display 104 and the right-eye display 105. FIG. 7 explains a virtual object 711 superimposed on a captured image 600. As illustrated in FIG. 7, the display control unit 123 displays the virtual object 711 on the left-eye display 104 and the right-eye display 105 so that the user can recognize that the virtual object 711 exists at a predetermined position in the real space.

Next, in step S903, the CPU 128 controls the display control unit 123 to display auxiliary information for the virtual object or the object in the real space on the left-eye display 104 and the right-eye display 105. Referring now to FIG. 9B, a detailed description will be given of the auxiliary information display processing.

First, in step S904, the CPU 128 controls the display control unit 123 to select a display area for auxiliary information. In the display apparatus 100, the user can see the real-world background through the left-eye display 104 and the right-eye display 105. Therefore, in a case where the background of the real space is bright, or in a case where the background of the real space and the features (such as color information) of the auxiliary information displayed on the left-eye display 104 and the right-eye display 105 are similar, the user has difficulty in recognizing the auxiliary information.

Figure 8A:
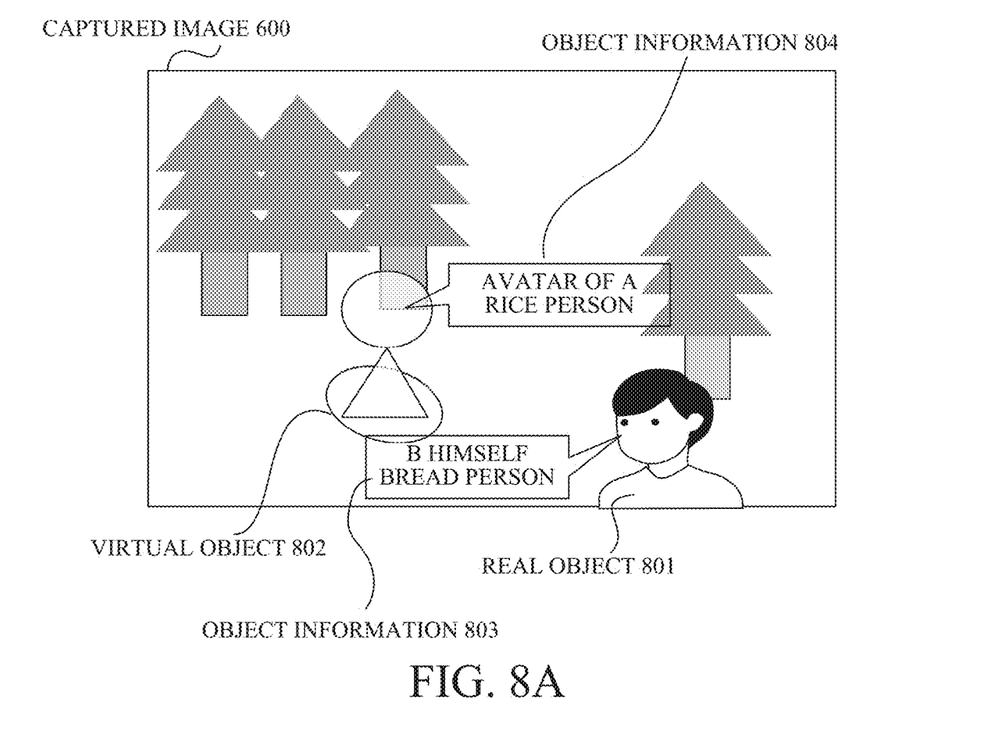
FIGS. 8A to 8D explain auxiliary information superimposed and displayed on a captured image in this embodiment.

Referring now to FIGS. 8A to 8D, a description will be given of an example in which it is difficult for the user to visually recognize auxiliary information. FIGS. 8A to 8D explain auxiliary information superimposed on the captured image 600 (auxiliary information displayed on the left-eye display 104 or the right-eye display 105). FIG. 8A illustrates a state in which object information (auxiliary information) 803 of a real object 801, a virtual object (main information) 802, and object information (auxiliary information) 804 of the virtual object 802 are superimposed and displayed on a captured image 600. Since the background of the real space ahead of the virtual object 802 and the object information 804 is bright, it is difficult for the user to visually recognize the virtual object 802 and the object information 804.

Figure 8B:
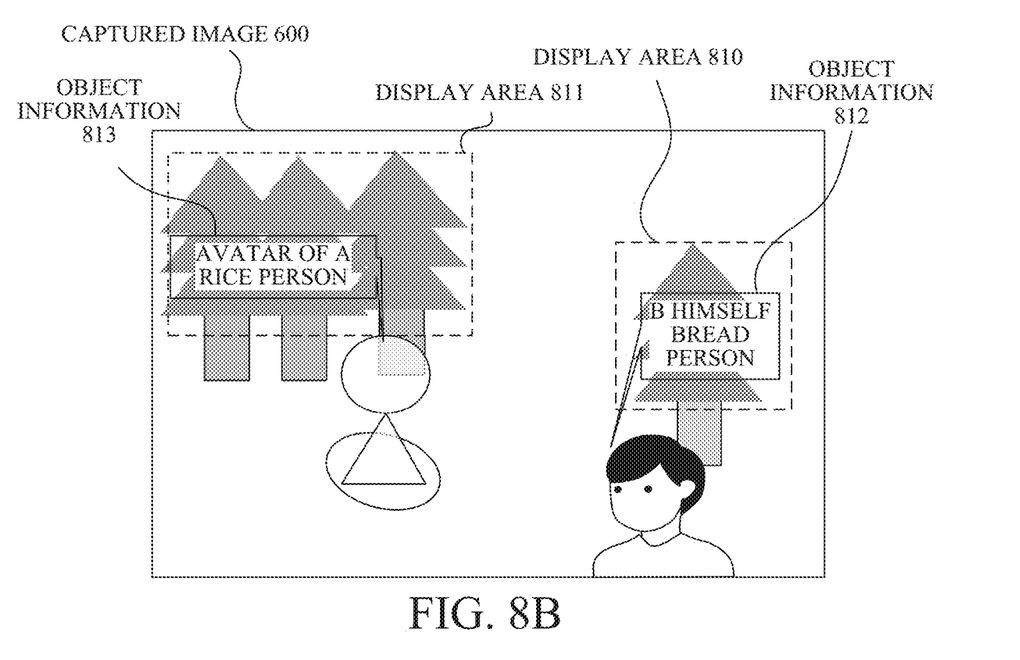

This embodiment first searches the captured image 600 illustrated in FIG. 6 for an area (position) suitable to display auxiliary information and easily visible to the user. The area suitable to display the auxiliary information is, for example, an area with a dark background in the real space (an area with low luminance in the captured image). FIG. 8B illustrates display areas 810 and 811 as areas with dark backgrounds in the real space. For example, the display control unit 123 compares first luminance of a first area and second luminance of a second area in the captured image based on the luminance information of the captured image. In a case where the second luminance is lower than the first luminance, the display control unit 123 sets the display area of the auxiliary information to the second area.

Another area suitable to display the auxiliary information includes an area where the color of the auxiliary information is different from the color of the background in the real space. For example, a background area having a color close to the complementary color of the auxiliary information. For example, the display control unit 123 compares the color information of the captured image with the color information of the object for each of the first area and the second area in the captured image, and determines a color space distance (distance in luminance space in the color space of the color luminance, or distance in hue space) between the captured image and the object. In a case where the color space distance for the first area is a first distance and the color space distance for the second area is a second distance longer than the first distance, the display control unit 123 sets the display area of the auxiliary information to the second distance. Alternatively, in a case where the auxiliary information does not lose its meaning as information, such as text information, even if the color is changed, the auxiliary information may be displayed in a color complementary to the background of the real space.

Figure 8C:
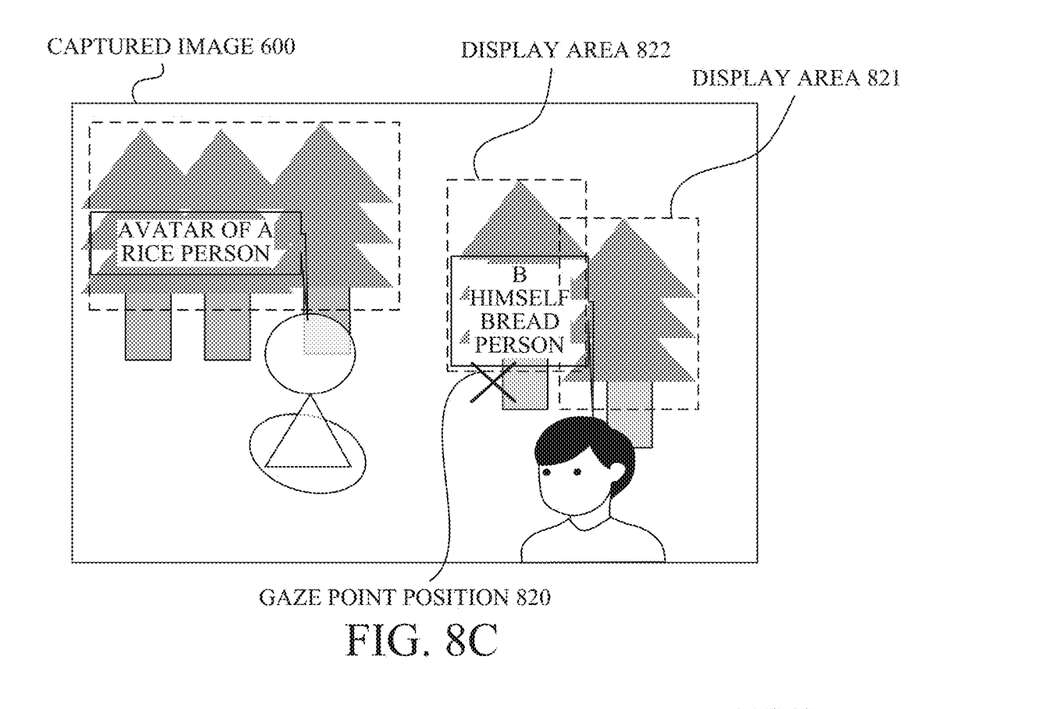

In a case where there are a plurality of areas suitable to display the auxiliary information, an area closer to the gaze position of the user detected using the line-of-sight detector 124 may be selected. In a case where as illustrated in FIG. 8C, two display areas 821 and 822 are areas suitable to display the auxiliary information, and in a case where the user is viewing a gaze point position 820, the auxiliary information can be displayed in the display area 821 closer to the gaze point position 820. That is, the display control unit 123 may change the display area of the auxiliary information based on the image information of the captured image and the position information of the gaze point detected by the line-of-sight detector 124.

Figure 8D:
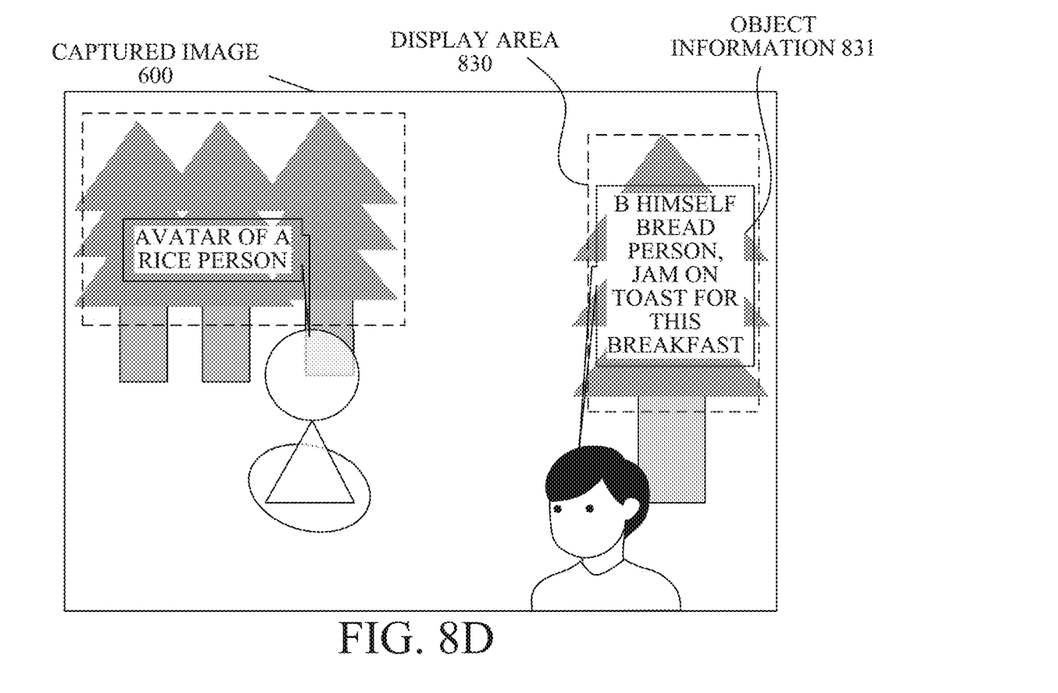

The amount or content of the auxiliary information to be displayed may be adjusted according to the size of the area suitable to display the auxiliary information. As illustrated in FIG. 8D, in a case where a display area 830 is larger than the display area 812 in FIG. 8B, more object information 831 may be displayed, which is the auxiliary information about the real object 801. In a case where the area suitable to display the auxiliary information is small, less auxiliary information may be displayed.

Next, in step S905 of FIG. 9B, the CPU 128 controls the display control unit 123 to display the auxiliary information in the display area selected in step S904. This embodiment enables the user to easily visually recognize the information by changing the display method of information displayed in the AR space based on the real space in the background.

Each embodiment changes the display method (at least one of the position of the display area, the size of the display area, and the display color) of the auxiliary information (object information) to be displayed in the AR space based on the real space in the background. Therefore, each embodiment can provide an image processing apparatus, a display apparatus, an image processing method, and a storage medium, each of which can enhance the visibility of object information superimposed and displayed on the real space.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-109481, filed on Jul. 7, 2022, which is hereby incorporated by reference herein in its entirety.

What is claimed is:

1. An image processing apparatus comprising:
at least one memory that stores a set of instructions; and
at least one processor that executes the set of instructions to:
acquire a captured image obtained by imaging real space; and
control object information displayed on a transmission-type display element that enables a user to observe the real space,
wherein the at least one processor changes a position of a display area of the object information on the transmission-type display element based on image information including color information or luminance information of the captured image, and
wherein the at least one processor does not set the display area of the object information to an area that is difficult to be visually recognized, based on the image information including the color information or the luminance information of the captured image.

2. The image processing apparatus according to claim 1, wherein the object information includes auxiliary information about an object, and
wherein the object is a real object existing in the real space or a virtual object displayed on the transmission-type display element.

3. The image processing apparatus according to claim 2, wherein the at least one processor is configured to change the position of the display area of the object information based on the color information of the captured image and color information of the object.

4. The image processing apparatus according to claim 3, wherein the at least one processor is configured to:
compare, for each of a first area and a second area in the captured image, the color information of the captured image and the color information of the object and determine a color space distance between the captured image and the object, and
set the display area for the object information to an area corresponding to the second area in a case where the color space distance with respect to the first area is a first distance and the color space distance with respect to the second area is a second distance longer than the first distance.

5. The image processing apparatus according to claim 3, wherein the at least one processor is configured to change a display color of the object information based on the color information of the captured image and the color information of the object.

6. The image processing apparatus according to claim 3, wherein the at least one processor is configured to:

compare first luminance of a first area and second luminance of a second area in the captured image based on the luminance information of the captured image, and
set the display area of the object information to an area corresponding to the second area in a case where the second luminance is lower than the first luminance.

7. The image processing apparatus according to claim 1, wherein the at least one processor is configured to:
extract a gaze point of a user, and
change the display area of the object information based on the image information of the captured image and position information of the gaze point.

8. The image processing apparatus according to claim 1, wherein the at least one processor is configured to change a position of a display area of the object information.

9. The image processing apparatus according to claim 1, wherein the at least one processor is configured to:
change a size of the display area of the object information, and
adjust an information amount or content of the object information according to a changed size of the display area.

10. A display apparatus comprising:
a transmission-type display element; and
an image processing apparatus,
wherein the image processing apparatus includes:
at least one memory that stores a set of instructions; and
at least one processor that executes the set of instructions to:
acquire a captured image obtained by imaging real space; and
control object information displayed on the transmission-type display element that enables a user to observe the real space,
wherein the at least one processor changes a position of a display area of the object information on the transmission-type display element based on image information including color information or luminance information of the captured image, and
wherein the at least one processor does not set the display area of the object information to an area that is difficult to be visually recognized, based on the image information including the color information or the luminance information of the captured image.

11. An image processing method comprising the steps of:
acquiring a captured image obtained by imaging real space; and
controlling object information displayed on a transmission-type display element that enables a user to observe the real space,
wherein the controlling step changes a position of a display area of the object information on the transmission-type display element based on image information including color information or luminance information of the captured image, and
wherein the controlling step does not set the display area of the object information to an area that is difficult to be visually recognized, based on the image information including the color information or the luminance information of the captured image.

12. A non-transitory computer-readable storage medium storing a program that causes a computer to execute the image processing method according to claim 11.

13. An image processing apparatus comprising:
at least one memory that stores a set of instructions; and
at least one processor that executes the set of instructions to:

acquire a captured image obtained by imaging real space; and control object information displayed on a transmission-type display element that enables a user to observe the real space, wherein the object information includes auxiliary information about an object, wherein the object is a real object existing in the real space or a virtual object displayed on the transmission-type display element, and wherein the at least one processor is configured to:

compare, for each of a first area and a second area in the captured image, the color information of the captured image and the color information of the object and determine a color space distance between the captured image and the object, and set a display area for the object information to an area corresponding to the second area in a case where the color space distance with respect to the first area is a first distance and the color space distance with respect to the second area is a second distance longer than the first distance.

14. An image processing apparatus comprising:

at least one memory that stores a set of instructions; and at least one processor that executes the set of instructions to:

acquire a captured image obtained by imaging real space; and control object information displayed on a transmission-type display element that enables a user to observe the real space, wherein the object information includes auxiliary information about an object, wherein the object is a real object existing in the real space or a virtual object displayed on the transmission-type display element, and wherein the at least one processor is configured to:

compare first luminance of a first area and second luminance of a second area in the captured image based on the luminance information of the captured image, and set a display area of the object information to an area corresponding to the second area in a case where the second luminance is lower than the first luminance.

15. An image processing method comprising the steps of:

acquiring a captured image obtained by imaging real space; and controlling object information displayed on a transmission-type display element that enables a user to observe the real space, wherein the object information includes auxiliary information about an object and the object is a real object existing in the real space or a virtual object displayed on the transmission-type display element, comparing, for each of a first area and a second area in the captured image, the color information of the captured image and the color information of the object and determining a color space distance between the captured image and the object, and setting a display area for the object information to an area corresponding to the second area in a case where the color space distance with respect to the first area is a first distance and the color space distance with respect to the second area is a second distance longer than the first distance.

16. An image processing method comprising the steps of:

acquiring a captured image obtained by imaging real space; and controlling object information displayed on a transmission-type display element that enables a user to observe the real space, wherein the object information includes auxiliary information about an object and the object is a real object existing in the real space or a virtual object displayed on the transmission-type display element, comparing first luminance of a first area and second luminance of a second area in the captured image based on the luminance information of the captured image, and setting a display area of the object information to an area corresponding to the second area in a case where the second luminance is lower than the first luminance.

* * * * *